US008945761B2

(12) United States Patent
Suzuki et al.

(10) Patent No.: US 8,945,761 B2
(45) Date of Patent: Feb. 3, 2015

(54) BATTERY

(75) Inventors: Isao Suzuki, Kyoto (JP); Takeshi Nakamoto, Kyoto (JP); Syun Ito, Kyoto (JP); Shogo Waki, Kyoto (JP)

(73) Assignee: GS Yuasa International Ltd., Kyoto-Shi, Kyoto (JP)

( * ) Notice: Subject to any disclaimer, the term of this patent is extended or adjusted under 35 U.S.C. 154(b) by 77 days.

(21) Appl. No.: 13/316,266

(22) Filed: Dec. 9, 2011

(65) Prior Publication Data

US 2012/0148911 A1 Jun. 14, 2012

(30) Foreign Application Priority Data

Dec. 10, 2010 (JP) ................................. 2010-276310

(51) Int. Cl.
| | | |
|---|---|---|
| H01M 2/30 | (2006.01) | |
| H01M 2/26 | (2006.01) | |
| H01M 2/04 | (2006.01) | |
| H01M 2/06 | (2006.01) | |
| H01M 10/04 | (2006.01) | |

(52) U.S. Cl.
CPC .............. *H01M 2/26* (2013.01); *H01M 2/0426* (2013.01); *H01M 2/043* (2013.01); *H01M 2/0473* (2013.01); *H01M 2/06* (2013.01); *H01M 2/30* (2013.01); *H01M 10/0431* (2013.01)
USPC .......................................... 429/179; 429/178

(58) Field of Classification Search
USPC ................................. 429/178, 179
See application file for complete search history.

(56) References Cited

U.S. PATENT DOCUMENTS

| | | | |
|---|---|---|---|
| 6,190,798 B1 | 2/2001 | Okada et al. | |
| 6,534,212 B1* | 3/2003 | Hooke | ............................ 429/94 |
| 6,579,640 B1 | 6/2003 | Nagase et al. | |
| 2003/0104276 A1 | 6/2003 | Mizuno et al. | |
| 2007/0154802 A1 | 7/2007 | Uh | |
| 2008/0038627 A1 | 2/2008 | Yamauchi et al. | |
| 2009/0136841 A1* | 5/2009 | Watanabe et al. | ............. 429/174 |

(Continued)

FOREIGN PATENT DOCUMENTS

| | | |
|---|---|---|
| JP | 2000-97822 A | 4/2000 |
| JP | 2000-311644 A | 11/2000 |

(Continued)

OTHER PUBLICATIONS

Extended European Search Report dated Jan. 16, 2013.

(Continued)

*Primary Examiner* — Mark F Huff
*Assistant Examiner* — Olatunji Godo
(74) *Attorney, Agent, or Firm* — McGinn IP Law Group, PLLC (57) ABSTRACT

A battery includes current collectors for electrically connecting a power generating element contained inside of a battery case to external terminals, respectively. A caulking head of a rivet for fixing the negative current collector to a cover is contained in a engagement recess which is a space inside of a engagement receiving portion in the cover. The positive current collector is caulked to the cover via a shaft of the positive external terminal. A caulking head at a tip end of the shaft is contained in the engagement recess which is a space defined inside of the engagement receiving portion. The caulking heads do not project from a lower surface of the cover, and therefore, a clearance space defined between the power generating element and the cover is set to the minimum.

19 Claims, 5 Drawing Sheets

(56) References Cited

U.S. PATENT DOCUMENTS

| | | |
|---|---|---|
| 2009/0186269 A1 | 7/2009 | Kim et al. |
| 2010/0143786 A1 | 6/2010 | Kim |
| 2010/0216008 A1 | 8/2010 | Yoon |
| 2010/0233526 A1* | 9/2010 | Tasai et al. ............ 429/164 |
| 2012/0148908 A1* | 6/2012 | Ito ........................ 429/179 |

FOREIGN PATENT DOCUMENTS

| | | |
|---|---|---|
| JP | 2001-93486 A | 4/2001 |
| JP | 2003-173767 A | 6/2003 |
| JP | 2003-346882 A | 12/2003 |
| JP | 2008-66254 A | 3/2008 |
| JP | 2009-277604 A | 11/2009 |

OTHER PUBLICATIONS

Japanese Office Action dated May 7, 2014.
United States Office Action dated Mar. 21, 2014 in U.S. Appl. No. 13/316,226.

* cited by examiner

I# BATTERY

BACKGROUND OF THE INVENTION

1. Field of the Invention

The present invention relates to a battery including a nonaqueous electrolytic secondary battery.

2. Description of the Related Art

A battery such as a nonaqueous electrolytic secondary battery includes a positive current collector and a negative current collector for electrically connecting a positive electrode and a negative electrode in a power generating element contained inside of a battery case to a positive external terminal and a negative external terminal, respectively. The current collectors are fixed to a cover for sealing an upper opening of the battery case by means such as caulking using, for example, a rivet (see, for example, Japanese Unexamined Patent Application Publication No. 2003-346882 (FIG. 1)). Moreover, there has been known a battery in which a shaft-like portion for caulking and joining a current collector to a cover is integrated with a base portion of the current collector (see, for example, Japanese Unexamined Patent Application Publication No. 2009-277604 (FIG. 2)).

The higher the occupancy of a power generating element with respect to the volume of a battery case, the higher the energy density. A cover for a conventional battery is formed into generally a flat shape. A caulking head of a rivet located inside of the battery case projects further downward of the lower surface of the cover. Therefore, it is necessary to position the upper end of the power generating element not in the vicinity of the lower surface of the cover but in the vicinity of the caulking head of the rivet disposed further below. In other words, the projection of the caulking head of the rivet unfavorably produces a dead space between the upper end of the power generating element and the lower end of the cover. In this regard, the occupancy of the power generating element with respect to the volume of the battery case in the conventional battery cannot be satisfactorily enhanced, and therefore, no high energy density can be achieved.

Like the battery disclosed in Japanese Unexamined Patent Application Publication No. 2009-277604, when the caulking and joining shaft-like portion is disposed at the base portion of the current collector, the base portion is positioned on the lower surface side of the cover. Therefore, it is necessary to position the upper end of the power generating element not in the vicinity of the lower surface of the cover but in the vicinity of the lower surface of the base portion located further below. Also in this case, a dead space is inevitably produced, and thus, the occupancy of a power generating element with respect to the volume of the battery case cannot be satisfactorily enhanced, and therefore, no high energy density can be achieved.

SUMMARY OF THE INVENTION

An object of the present invention is to enhance the occupancy of a power generating element with respect to the volume of a battery case so as to improve energy density.

A battery according to a first aspect of the present invention includes:

a battery case which contains a power generating element therein and whose top surface is opened;

a cover which covers the top surface of the battery case;

an external terminal whose at least part is disposed outside of the cover;

a current collector which electrically connects the power generating element to the external terminal; and a joining member which fixes the current collector to the cover;

wherein a head of the joining member is contained in a recess formed at an inner surface of the cover.

The head of the joining member is contained in the recess formed at the inner surface of the cover, and does not project from the inner surface of the cover. Therefore, the end of the power generating element is located in the vicinity of the inner surface of the cover, so that a clearance space between the power generating element and the cover can be limited to the required minimum. In other words, the head of the joining member does not project from the cover, thereby defining no dead space between the power generating element and the inner surface of the cover. Consequently, the occupancy of the power generating element with respect to the volume of the battery case can be satisfactorily enhanced, thus achieving high energy density.

Preferably, the recess is a space inside of an expanding portion in which a part of the cover expands outward.

The formation of the three-dimensional expanding portion by expanding a part of the cover increases a section modulus at the expanding portion more than that in the case of a mere flat plate member, thus enhancing the rigidity of the cover without any increase in thickness which may cause an increase in weight.

Much preferably, the expanding portion is formed by drawing the cover.

The expanding portion formed by drawing causes work hardening to be produced around the expanding portion of the cover, thereby locally increasing a yield stress, so as to further enhance the rigidity of the cover.

For example, the joining member is a rivet.

The rivet may be adapted to fix only the current collector to the cover, or to fix both of the current collector and the outside electrode to the cover. In this case, the external terminal includes a plate-like member disposed outside of the cover, and the rivet includes a flange which is press-fitted into a through hole formed in the plate-like member and a shaft which projects from the flange into the recess and defines the head at the tip end thereof.

Alternatively, the joining member is the external terminal.

That is to say, the battery comprising:

a battery case which contains a power generating element therein and whose top surface is opened;

a cover which covers the top surface of the battery case;

an external terminal whose at least part is disposed outside of the cover; and a current collector which electrically connects the power generating element to the external terminal, wherein the external terminal fixes the current collector to the cover and a head of the external terminal is contained in a recess formed at an inner surface of the cover.

In this case, the external terminal includes: a plate-like member disposed outside of the cover; and a shaft which projects from the plate-like member into the cover and defines the head at the tip end thereof.

A battery according to a second aspect of the present invention includes:

a battery case which contains a power generating element therein and whose top surface is opened;

a cover which covers the top surface of the battery case;

an external terminal whose at least part is disposed outside of the cover; and a current collector which electrically connects the power generating element to the external terminal, the current collector comprising a base which is connected to the cylindrical terminal;

wherein at least a part of the base is contained in a recess formed at an inner surface of the cover.

At least a part of the base of the current collector is contained in the recess formed at the inner surface of the cover, and does not project from the inner surface of the cover. Therefore, the end of the power generating element is located in the vicinity of the inner surface of the cover, so that a clearance space defined between the power generating element and the cover can be limited to the required minimum. In other words, the base of the current collector does not project from the cover, thereby defining no dead space between the power generating element and the inner surface of the cover. Consequently, the occupancy of the power generating element with respect to the volume of the battery case can be satisfactorily enhanced, thus achieving high energy density.

DETAILED DESCRIPTION OF THE PREFERRED EMBODIMENTS

A detailed description will be given below of embodiments according to the present invention with reference to the attached drawings.

(First Preferred Embodiment)

Figure 1:
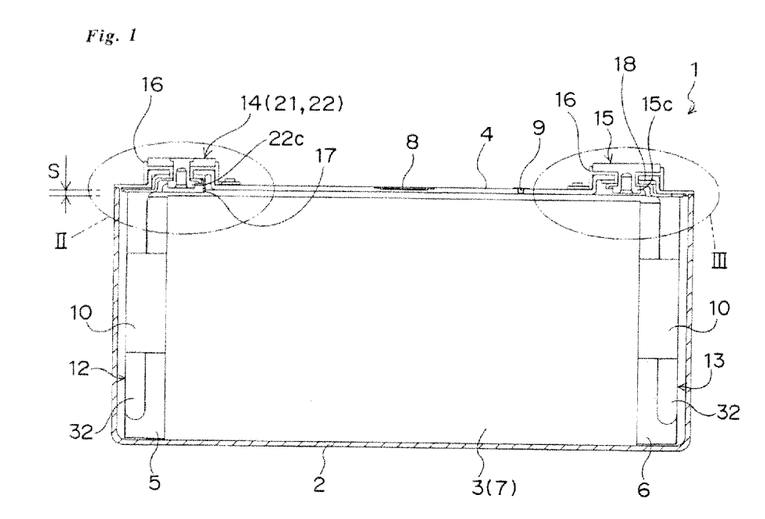
FIG. 1 is a cross-sectional front view of a battery in a first embodiment according to the present invention.

FIG. 1 shows a nonaqueous electrolytic secondary battery 1 (hereinafter simply referred to as a battery) in an embodiment according to the present invention. A power generating element 3 in the battery 1 is housed in a battery case 2 which is made of aluminum or an aluminum alloy and is formed into a rectangular parallelepiped shape. An upper opening of the battery case 2 is sealed by a cover 4. The upper surfaces of a negative external terminal 14 and a positive external terminal 15 are exposed to the outside of the cover 4.

The power generating element 3 includes a negative electrode 5 formed of a copper foil, a positive electrode 6 formed of an aluminum foil, and a separator 7 formed of a porous resin film and interposed between the negative electrode 5 and the positive electrode 6. All of these members are formed into a belt shape, and the negative electrode 5 and the positive electrode 6 are flat wound in the state in which the negative electrode 5 and the positive electrode 6 are displaced with respect to the separator 7 oppositely in a widthwise direction. In the power generating element 3, the negative electrode 5 is electrically connected to the negative external terminal 14 via a negative current collector 12 whereas the positive electrode 6 is electrically connected to the positive external terminal 15 via a positive current collector 13.

Figure 4:
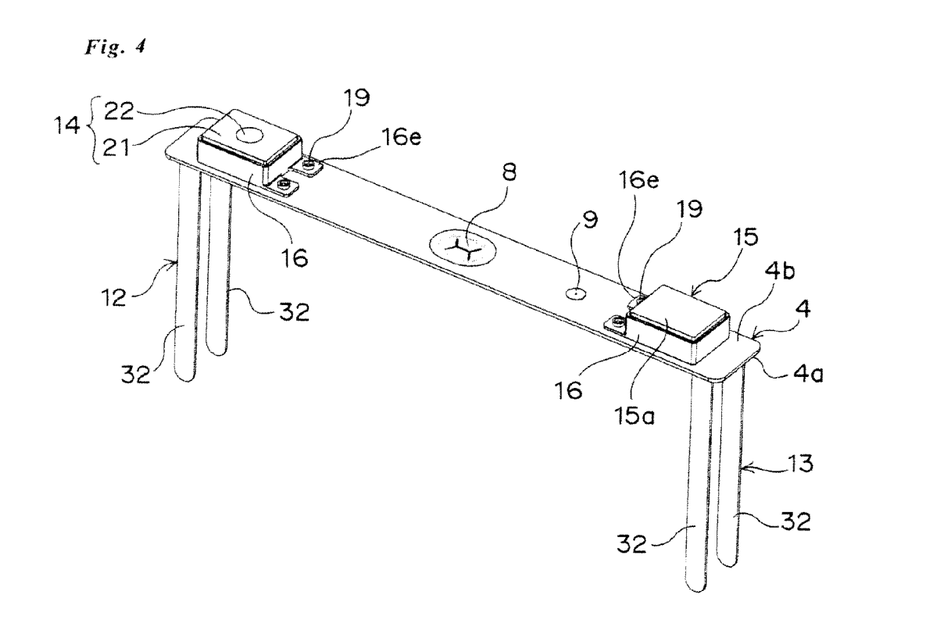
FIG. 4 is a perspective view showing a cover of FIG. 1, as viewed from the top.
Figure 5:
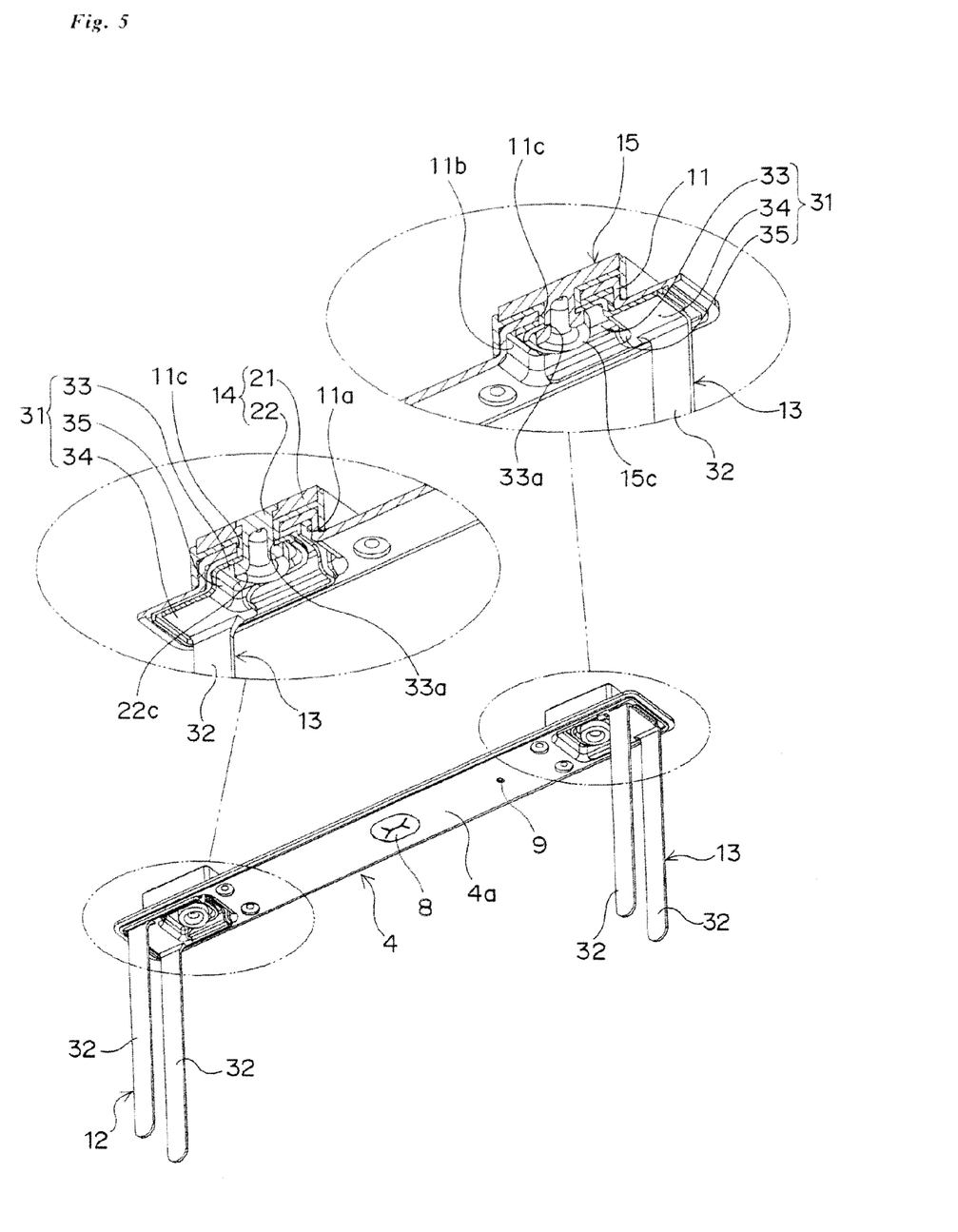
FIG. 5 is a perspective view of the cover of FIG. 1, as viewed from the bottom.
Figure 6:
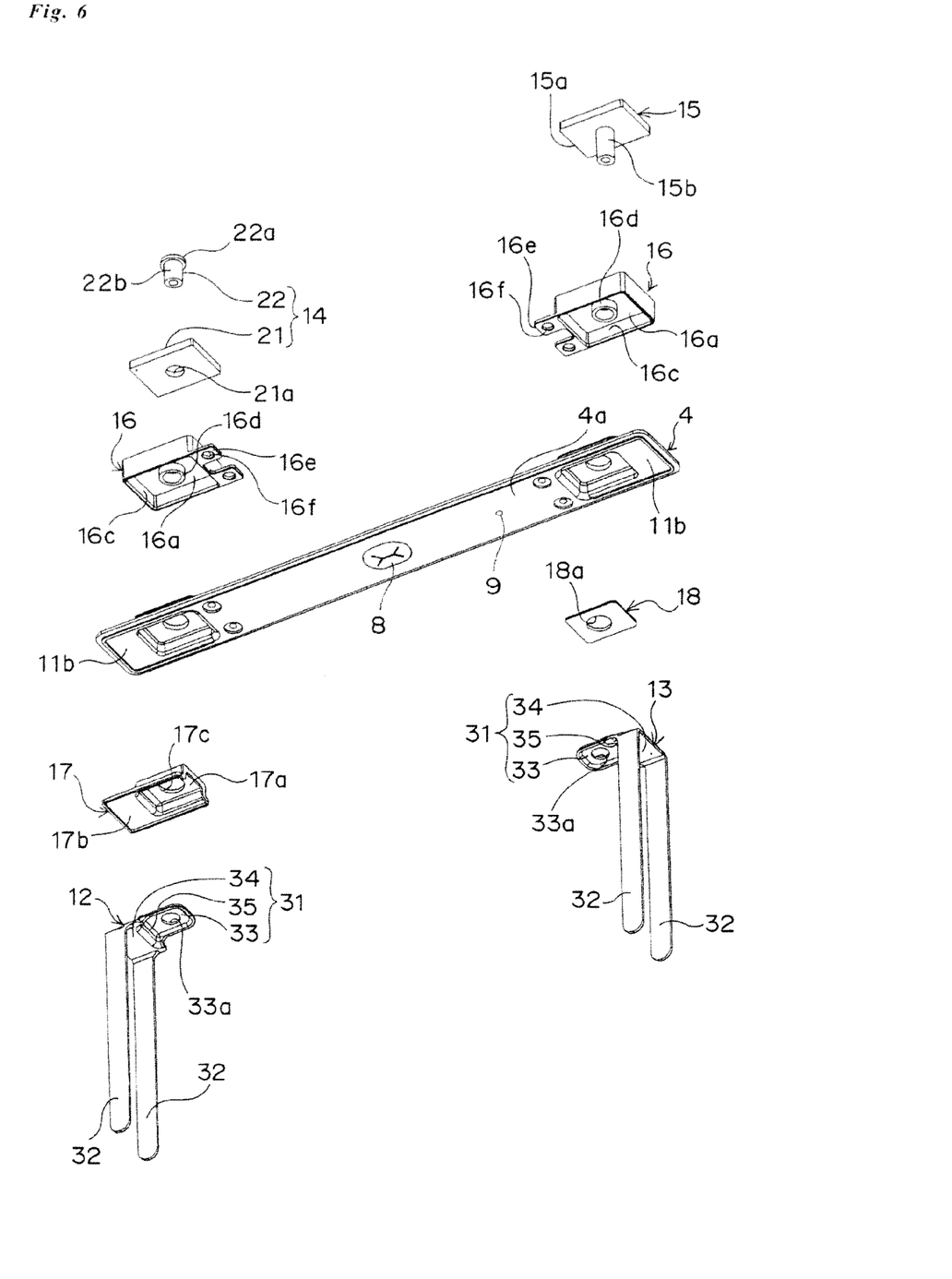
FIG. 6 is an exploded perspective view of the cover of FIG. 5.

Referring to FIGS. 4 to 6 together, the cover 4 is made of an elongated metallic plate formed into a rectangular shape, as viewed on plane. The cover 4 includes a safe valve 8 near the center thereof in a longitudinal direction and a liquid injection hole 9 formed at one end thereof.

An engagement receiving portion (i.e., an expanded portion) 11 formed into a substantially rectangular shape, as viewed on plane, is formed at both ends of the cover 4 so as to expand upward from an upper surface 4b. The engagement receiving portion 11 has an engagement recess 11a formed by depressing a lower surface 4a of the cover 4. Moreover, a shallow guide recess 11b is formed around the engagement recess 11a except one side at the lower surface 4a of the cover 4. Additionally, a through hole 11c is formed at the center of a ceiling constituting the engagement recess 11a.

In FIGS. 4 to 6, the negative external terminal 14 and the negative current collector 12 are fitted to the engagement receiving portion 11 and the guide recess 11b on the left via an upper gasket 16 and a negative lower gasket 17, respectively.

The upper gasket 16 is a resin part having a terminal holding recess 16b on the upper side and a mounting recess 16c on the lower side which are partitioned by a partition wall 16a. A cylindrical portion 16d extending downward and having openings at both ends thereof is formed at the center of the partition wall 16a. The upper gasket 16 is put on the engagement receiving portion 11 from above, and then attached to the cover 4 by containing the engagement receiving portion 11 in the mounting recess 16c. The cylindrical portion 16d is inserted into the through hole 11c to intrude into the engagement recess 11a. Moreover, lock projections 19 projecting from the upper surface 4b of the cover 4 are inserted into lock holes 16f formed at two tongue pieces 16e provided in the upper gasket 16.

The negative lower gasket 17 includes a caulked portion 17a which is to be contained inside of the engagement recess 11a of the cover 4, and a flat portion 17b which is disposed continuously to the caulked portion 17a to be contained in the guide recess 11b of the engagement receiving portion 11. The caulked portion 17a is formed into a shape in conformity with the inner surface of the engagement recess 11a of the engagement receiving portion 11 except one side. Moreover, a through hole 17c is formed at the caulked portion 17a. Into the through hole 17c is inserted the cylindrical portion 16d of the upper gasket 16 near the lower end thereof.

The negative external terminal 14 includes an aluminum plate-like member 21 having a rectangular shape, as viewed on plane, and a copper rivet (i.e., caulking and joining member) 22. A flange 22a is press-fitted into a through hole 21a formed at the center of the plate-like member 21 so that the rivet 22 is fixed to the plate-like member 21 in the state in which a shaft 22b projects. The plate-like member 21 is contained in the terminal holding recess 16b of the upper gasket 16.

The negative current collector 12 fabricated by pressing a copper plate material includes a base 31 and a pair of legs 32 and 32. The base 31 includes a caulked portion 33, which is contained inside of the engagement recess 11a and disposed on the lower side of the caulked portion 17a in the negative lower gasket 17, and a mount 34 which is disposed on the lower side of the flat portion 17b of the negative lower gasket 17 at a position adjacent to the engagement recess 11a. A through hole 33a for allowing the shaft 22b of the rivet 22 in the negative external terminal 14 to be inserted therethrough is formed at the center of the caulked portion 33. The legs 32 and 32 extend from the mount 34, and then, are electrically connected to and mechanically coupled to the negative electrode 5 in the power generating element 3 via a clip 10 schematically shown only in FIG. 1.

The shaft 22b of the rivet 22 in the negative external terminal 14 is inserted into the cylindrical portion 16d of the upper gasket 16 and the through hole 33a formed in the caulked portion 33 in the negative current collector 12, and then, the tip is widened under pressure, thereby forming a caulking head 22c. Consequently, the negative external terminal 14, the upper gasket 16, the negative lower gasket 17, and the caulked portion 33 of the negative current collector 12 are caulked and joined to the cover 4. Moreover, the caulked portion 33 of the negative current collector 12 is electrically connected to the plate 21 of the negative external terminal 14 via the rivet 22.

In FIGS. 4 to 6, the positive external terminal 15 and the positive current collector 13 are fixed to the engagement receiving portion 11 and the guide recess 11b on the right side via the upper gasket 16 and a positive lower gasket 18, respectively.

In the same manner as the side of the negative electrode, the upper gasket 16 is attached to the engagement receiving portion 11. Moreover, the positive lower gasket 18 is formed into a plate having a through hole 18a, and is disposed inside of the engagement recess 11a.

The positive external terminal (i.e., the caulking and joining member) 15 is made of aluminum, and includes a plate-like member 15a formed into a rectangular shape, as viewed on plane, and a cylindrical shaft 15b projecting from the center of the lower surface of the member 15a. The plate-like member 15a is contained in a terminal holding recess 16b of the upper gasket 16.

The positive current collector 13 fabricated by pressing an aluminum plate material has a structure similar to that of the negative current collector 12. Therefore, the same or similar elements as or to those of the negative current collector 12 are designated by the same reference numerals. The caulked portion 33 of the base 31 of the positive current collector 13 is contained in the engagement recess 11a and disposed on the positive lower gasket 18. The mount 34 to be positioned adjacently to the engagement recess 11a is disposed at the lower surface 4a of the cover 4 without the positive lower gasket 18. The legs 32 and 32 of the positive current collector 13 are electrically connected to and mechanically coupled to the positive electrode 6 of the power generating element 3 via the clip 10, schematically shown only in FIG. 1.

The shaft 15b of the positive external terminal 15 is inserted into the cylindrical portion 16d of the upper gasket 16 and the through hole 33a formed at the caulked portion 33 of the positive current collector 13, and then, the tip is widened under pressure, thereby forming the caulking head 15c. Consequently, the positive external terminal 28, the upper gasket 16, the positive lower gasket 18, and the caulked portion 33 of the positive current collector 13 are caulked and joined to the cover 4. The caulked portion 33 of the positive current collector 13 is electrically connected to the positive external terminal 15 in direct contact with the shaft 15b.

Figure 2:
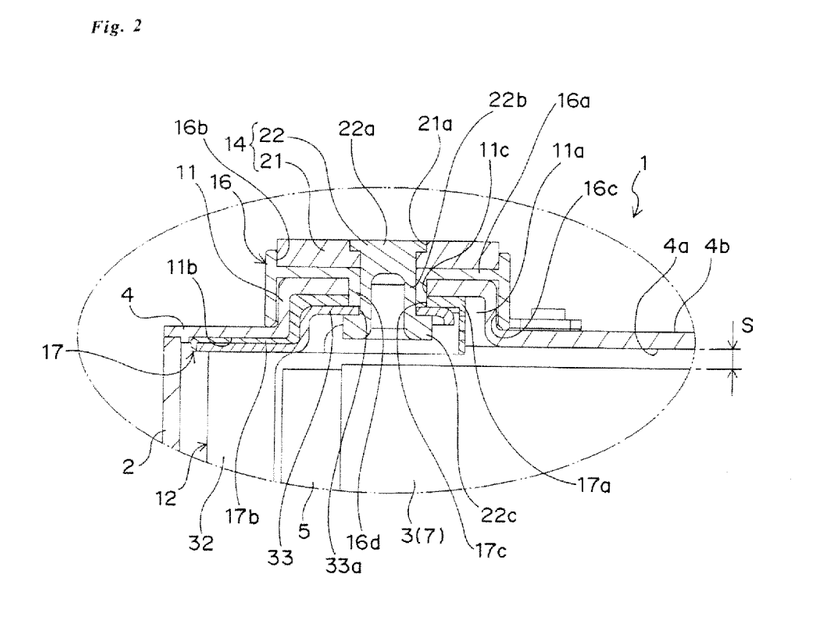
FIG. 2 is an enlarged view of a section encircled by reference numeral II of FIG. 1.
Figure 3:
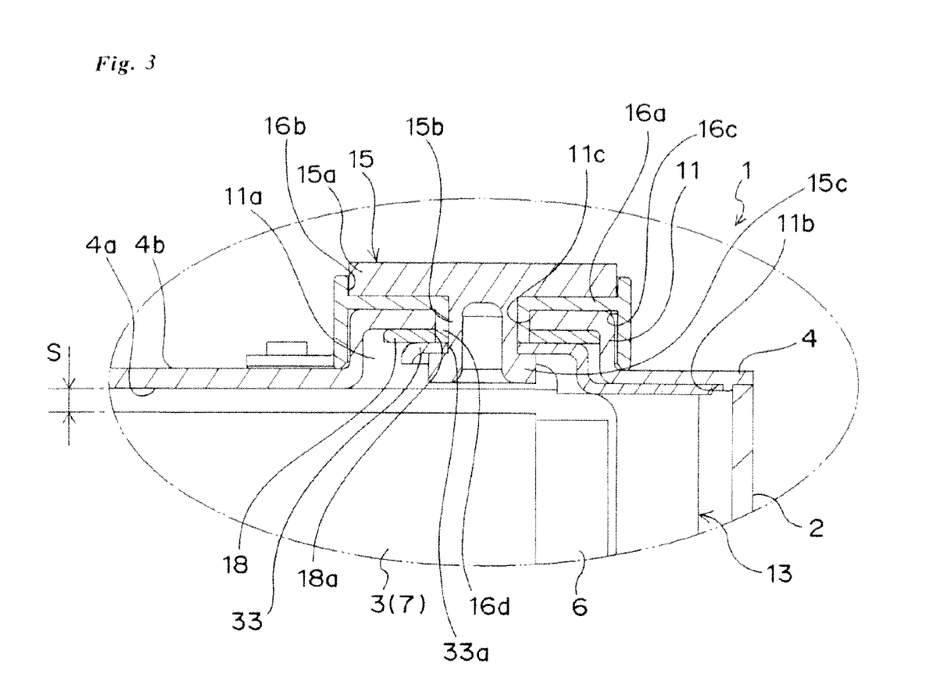
FIG. 3 is an enlarged view of a section encircled by reference numeral III of FIG. 1.

As most clearly shown in FIG. 2, the caulking head 22 at the tip of the shaft 22a of the rivet 22 for caulking and joining the caulked portion 33 of the negative current collector 12 to the cover 4 is contained in the engagement recess 11a formed at the lower surface of the cover 4, but does not project downward from the lower surface of the cover 4. In the same manner, as most clearly shown in FIG. 3, the caulking head 15c at the tip of the shaft 15b of the positive external terminal 15 for caulking and joining the caulked portion 33 of the positive current collector 13 to the cover 4 is contained in the engagement recess 11a formed at the lower surface of the cover 4, but does not project downward from the lower surface of the cover 4.

In this manner, the caulking heads 22c and 15c for caulking and joining the current collectors 12 and 13 to the cover 4 are contained inside of the engagement recesses 11a, respectively, at both of the negative side and the positive side, but do not project from the lower surface 4a of the cover 4. Therefore, the upper end of the power generating element 3 is positioned in the vicinity of the lower surface of the cover 4, so that a clearance space (conceptually shown by reference character S in FIGS. 2 and 3) between the power generating element 3 and the cover 4 can be defined to the required minimum. For example, a clearance space S is defined to a minimum clearance capable of securing a smooth flow of an electrolyte when the electrolyte is injected into the battery case 2 through the liquid injection hole 9. In this manner, the caulking heads 22c and 15c do not project from the cover 4, and therefore, no dead space is defined between the power generating element 3 and the lower surface 4a of the cover 4. Consequently, the occupancy of the power generating element 3 with respect to the volume of the battery case can be satisfactorily enhanced, and therefore, high energy density can be achieved.

For example, assuming that the energy density of the conventional battery is 100 Wh/L when the height from the bottom of the battery case 2 to the lower surface 4a of the cover 4 is 100 mm, the energy density can be improved to 104 Wh/L by adopting the configuration in which the caulking heads 22a and 15c are contained inside of the engagement recesses 11a in the present embodiment.

Alternatively, if the upper end of the power generating element 3 should be disposed near the lower surface 4a of the cover 4 without containing the caulking heads 22c and 15c in the engagement recesses 11a, the power generating element 3 may be possibly degraded due to shrinkage of the separator 7 or the like caused by contact resistance generated between the caulking head 22c and the caulked portion 33 of the negative current collector 12 or heat generated by the contact resistance between the caulking head 15c and the caulked portion 33 of the positive current collector 13. However, in the present embodiment, the caulking heads 22c and 15c are contained in the engagement recesses 11a, and therefore, the contact portions between the caulking heads 22c and 15c where heat may be generated due to the contact resistance and the current collectors 12 and 13 are sufficiently separated from the power generating element 3 even if the power generating element 3 is disposed near the lower surface of the cover 4. That is to say, in the present embodiment, the caulking heads 22c and 15c are contained in the engagement recesses 11a, so that the energy density can be improved without any degradation of the power generating element 3 due to the heat generation caused by the contact resistance.

In the present embodiment, the engagement receiving portion 11 is formed by expanding a part of the cover 4 in a three-dimensional fashion, and further, its inside serves as the engagement recess 11a for containing each of the caulking heads 22c and 15c therein. The formation of the engagement receiving portion 11 expanded in the three-dimensional fashion increases a section modulus at this portion more than that in the case of a mere flat plate, and thus, the rigidity of the cover 4 can be enhanced without any increase in thickness which causes an increase in weight.

Moreover, in the present embodiment, the engagement receiving portion 11 (or the engagement recess 11a) is formed by drawing the cover 4. As a consequence, work hardening is generated around the engagement receiving portion 11 of the cover 4, thereby locally increasing a yield stress, so as to suppress plastic deformation of the cover 4. In other words, the rigidity of the cover 4 can be enhanced by drawing the engagement receiving portion 11.

In the case where the cover 4 is made of, for example, material A1050, the cover 4 is deformed around the external terminal 14 or 15 with the application of external force of several tens N to about 100 N in the conventional battery: in contrast, the cover 4 cannot be deformed by the effect of the engagement receiving portion 11 expanded by drawing even with the application of external force of several hundreds N to about 1 kN in the present embodiment.

As most clearly shown in FIG. 2, the caulked portion 33, through which the shaft 22a of the rivet 22 penetrates, at the base 31 of the negative current collector 12 is contained in the engagement recess 11a formed at the lower surface of the cover 4, but does not project downward of the lower surface of the cover 4. In the same manner, as most clearly shown in FIG. 3, the caulked portion 33 of the positive current collector 13 is contained in the engagement recess 11a formed at the lower surface of the cover 4, but does not project downward of the lower surface of the cover 4.

As described above, the caulked portions 33 at the bases 31 of the current collectors 12 and 13 are contained inside of the engagement recesses 11a at both of the negative side and the positive side, but do not project from the lower surface 4a of the cover 4. Thus, no dead space is defined between the power generating element 3 and the lower surface 4a of the cover 4. As a consequence, it is possible to satisfactorily enhance the occupancy of the power generating element 3 with respect to the volume of the battery case 2, so as to achieve the high energy density.

(Second Preferred Embodiment)

Figure 7:
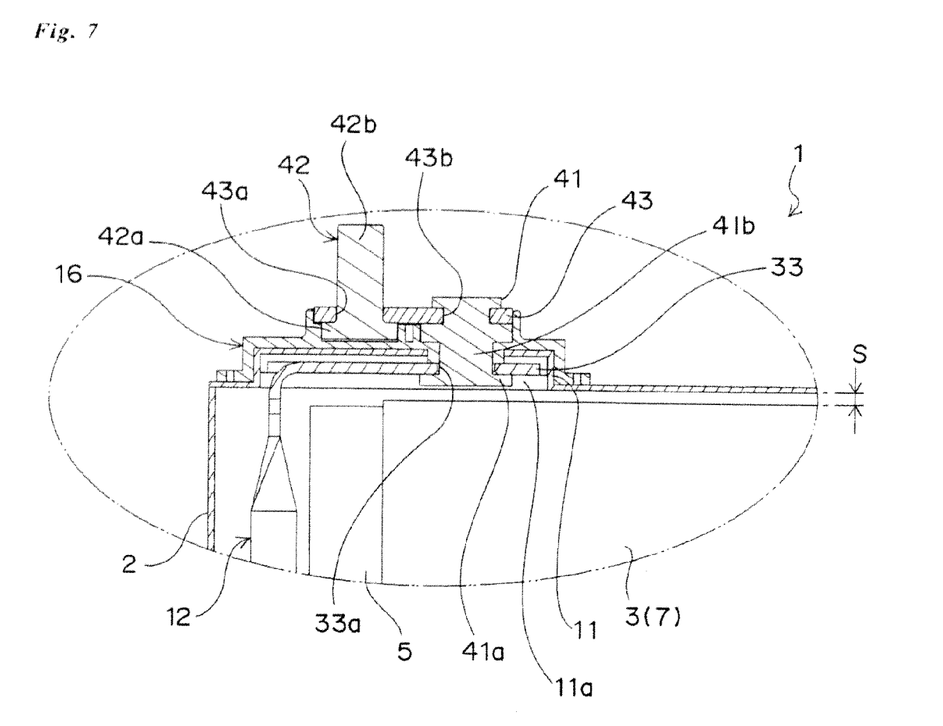
FIG. 7 is a partly enlarged cross-sectional view of a battery in a second embodiment according to the present invention.

FIG. 7 shows a battery 1 in a second embodiment according to the present invention. FIG. 7 shows only the side of a negative electrode. A structure on the side of a positive electrode is the same as that of the negative electrode.

A negative external terminal 42 in the present embodiment is formed into a bolt shape including a head 42a and a shaft 42b having a male screw threaded thereat. A rivet 41 and the negative external terminal 42 are electrically connected to each other via a connecting rod 43. Specifically, the head 42a of the negative external terminal 42 is contained inside a recess formed at the upper surface of an upper gasket 16, and further, the shaft 42b projecting upward is inserted into a through hole 43a formed in the connecting rod 43. In the meantime, the upper end of a shaft 41b of the rivet 41 is caulked and joined to another through hole 43b formed in the connecting rod 43. Moreover, the shaft 41b of the rivet 41 is inserted into a cylindrical portion 16d of the upper gasket 16 and a through hole 33a formed in a caulked portion 33 in a negative current collector 12, to then enter into an engagement recess 11a. A caulking head 41a is formed by widening the tip of the shaft 41b positioned at the engagement recess 11a under pressure.

The caulking head 41a at the lower end of the rivet 41 is contained inside of the engagement recess 11a disposed at a lower surface 4a of a cover 4, and it does not project downward of the lower surface 4a of the cover 4. Therefore, a clearance space S defined between a power generating element 3 and the cover 4 is set to the required minimum, and further, high energy density can be achieved by sufficiently increasing the occupancy of the power generating element 3 with respect to the volume of a battery case 2.

Additionally, the engagement recess 11a is a space inside of the engagement receiving portion 11 which is formed in such a manner as to expand outside in a three-dimensional fashion by drawing the cover 4. Therefore, an increase in section modulus at the engagement receiving portion 11 and work hardening around the engagement receiving portion 11 at the cover 4 can enhance the rigidity of the cover 4 without any increase in thickness which may cause an increase in weight.

In addition, the caulked portion 33 in the negative current collector 12 is contained inside of the engagement recess 11a, and does not project from the lower surface of the cover 4. Also in this regard, no dead space is defined between the power generating element 3 and the lower surface 4a of the cover 4. Consequently, the occupancy of the power generating element 3 with respect to the volume of the battery case 2 can be satisfactorily enhanced, and therefore, high energy density can be achieved.

The other configuration in the second embodiment is similar to that in the first embodiment, and therefore, the same elements are designated by the same reference numerals, and its explanation will be omitted below.

The present invention is not limited to the embodiments, various modifications can be implemented, as exemplified below.

In a configuration in which a grooved recess is formed at a lower surface of a flat cover having a relatively great thickness, that is, a recess is formed without expanding the cover, a caulking head is contained in the recess, thereby enhancing the occupancy of the power generating element inside of the battery case, so as to achieve energy density.

In the first and second embodiments, the caulking heads 15c, 22c, and 41a contained inside of the engagement recesses 11a and the bases 33 of the current collectors 12 and 13 do not project from the lower surface 4a of the cover 4. However, the caulking head or the base of the current collector need not always be completely contained inside of the engagement recess as long as the high energy density can be achieved by enhancing the occupancy of the power generating element inside of the battery case, and therefore, it may slightly project from the lower surface of the cover.

Although the present invention has been described by way of the nonaqueous electrolytic secondary battery, the present invention can be applied to batteries other than the nonaqueous electrolytic secondary battery.

What is claimed is:

1. A battery, comprising:
a battery case which contains a power generating element therein and whose top surface is opened;
a cover which covers the top surface of the battery case and includes an expanding portion that is formed as a part of the cover expanding upward from an upper surface of the cover, a bottom surface of the cover being formed with a recess that includes a space inside of the expanding portion;
an external terminal, at least part of the external terminal being disposed outside of the cover;
a current collector which electrically connects the power generating element to the external terminal, the current collector comprising a base and a leg, the base comprising a caulked portion, the leg being connected to the power generating element; and
a joining member which fixes the caulked portion to the cover,
wherein the caulked portion and a head of the joining member are contained in the recess, and
wherein the head of the joining member caulks the caulked portion for fixing the current collector to the cover.

2. A battery, comprising:
a battery case which contains a power generating element therein and whose top surface is opened;
a cover which covers the top surface of the battery case and includes an expanding portion that is formed as part of the cover expanding upward from an upper surface of the cover, a bottom surface of the cover being formed with a recess that includes a space inside of the expanding portion;

an external terminal, at least part of the external terminal being disposed outside of the cover;

a current collector which electrically connects the power generating element to the external terminal, the current collector comprising a base and a leg, the base comprising a caulked portion, the leg being connected to the power generating element; and a joining member which fixes the caulked portion to the cover, wherein the caulked portion and a head of the joining member are contained in the recess, and wherein the recess includes the space inside of the expanding portion in which part of the cover expands upward from the upper surface of the cover.

3. The battery according to claim 2, wherein the expanding portion is formed by drawing the cover such that the expanding portion is an integral part of the cover.

4. The battery according to claim 1, wherein the joining member comprises a rivet.

5. The battery according to claim 4, wherein the external terminal includes a plate-like member disposed outside of the cover, and
   wherein the rivet includes a flange which is press-fitted into a through hole formed in the plate-like member and a shaft which projects from the flange into the recess and defines the head at a tip end thereof.

6. The battery according to claim 1, wherein the joining member comprises the external terminal.

7. The battery according to claim 6, wherein the external terminal comprises:
   a plate-like member disposed outside of the cover; and
   a shaft which projects from the plate-like member into the cover and defines the head at a tip end thereof.

8. A battery, comprising:
   a battery case which contains a power generating element therein and whose top surface is opened;
   a cover which covers the top surface of the battery case and includes an expanding portion that is formed as a part of the cover expanding upward from an upper surface of the cover, a bottom surface of the cover being formed with a recess that includes a space inside of the expanding portion;
   an external terminal, at least part of the external terminal being disposed outside of the cover; and
   a current collector which electrically connects the power generating element to the external terminal, the current collector comprising a base and a leg, the base comprising a caulked portion, the leg being connected to the power generating element,
   wherein the external terminal fixes the caulked portion to the cover,
   wherein the caulked portion and a head of the external terminal are contained in the recess, and
   wherein the head of the external terminal caulks the caulked portion for fixing the current collector to the cover.

9. The battery according to claim 8, wherein the external terminal comprises:
   a plate-like member disposed outside of the cover; and
   a shaft which projects from the plate-like member into the cover and defines the head at a tip end thereof.

10. A battery, comprising:
    a battery case which contains a power generating element therein and whose top surface is opened;
    a cover which covers the top surface of the battery case and includes an expanding portion that is formed as a part of the cover expanding upward from an upper surface of the cover, a bottom surface of the cover being formed with a recess that includes a space inside of the expanding portion;
    an external terminal, at least part of the external terminal being disposed outside of the cover; and
    a current collector which electrically connects the power generating element to the external terminal, the current collector comprising a base and a leg, the base comprising a caulked portion, the leg being connected to the power generating element,
    wherein the external terminal fixes the caulked portion to the cover,
    wherein the caulked portion and a head of the external terminal are contained in the recess, and
    wherein the head of the external terminal caulks the caulked portion for fixing the current collector to the cover.

11. The battery according to claim 10, wherein the recess includes the space inside of the expanding portion in which the part of the cover expands upward from the upper surface of the cover.

12. The battery according to claim 10, wherein the expanding portion is formed by drawing the cover such that the expanding portion is an integral part of the cover.

13. The battery according to claim 1, wherein the expanding portion is an integral part of the cover that protrudes upward from the upper surface of the cover around the external terminal.

14. The battery according to claim 13, wherein the recess is defined by a bottom surface of the cover and walls of the expanding portion, and
    wherein a lower side of the recess is opened.

15. The battery according to claim 1, wherein an entirety of the head of the joining member is located in the recess.

16. The battery according to claim 15, wherein the head of the joining member comprises a widened portion of the joining member that protrudes outward from the joining member in the recess.

17. The battery according to claim 2, wherein the recess is defined by a bottom surface of the cover and walls of the expanding portion, and
    wherein a lower side of the recess is opened.

18. The battery according to claim 8, wherein the expanding portion is an integral part of the cover that protrudes upward from an upper surface of the cover around the external terminal.

19. The battery according to claim 18, wherein the head of the external terminal comprises a widened portion of the external terminal that protrudes outward from the external terminal in the recess.

* * * * *